(12) United States Patent
Dawes

(10) Patent No.: US 7,617,690 B2
(45) Date of Patent: Nov. 17, 2009

(54) BLOOD PRODUCTS FREEZER WITH EVENT LOG

(75) Inventor: Dennis K. Dawes, Indianapolis, IN (US)

(73) Assignee: Helmer, Inc., Noblesville, IN (US)

( * ) Notice: Subject to any disclaimer, the term of this patent is extended or adjusted under 35 U.S.C. 154(b) by 492 days.

(21) Appl. No.: 10/979,663

(22) Filed: Nov. 2, 2004

(65) Prior Publication Data
US 2006/0090482 A1    May 4, 2006

(51) Int. Cl.
*F25B 49/00*    (2006.01)
*F25D 21/06*    (2006.01)
(52) U.S. Cl. .......................................... 62/131; 62/153
(58) Field of Classification Search ................. 62/80, 62/151, 153, 155, 126, 127, 129, 131
See application file for complete search history.

(56) References Cited

U.S. PATENT DOCUMENTS

| | | | | |
|---|---|---|---|---|
| 4,411,139 A * | 10/1983 | Bos | .............................. | 62/126 |
| 4,463,348 A * | 7/1984 | Sidebottom | ................. | 340/585 |
| 4,566,285 A * | 1/1986 | Tershak et al. | ................ | 62/129 |
| 5,262,758 A * | 11/1993 | Nam et al. | ................... | 340/588 |
| 5,596,878 A * | 1/1997 | Hanson et al. | ................ | 62/160 |
| 5,623,836 A * | 4/1997 | Mrozinsky et al. | ............ | 62/151 |
| 6,119,471 A * | 9/2000 | Tanaka et al. | ................. | 62/130 |
| 6,401,466 B1 * | 6/2002 | Olsen | ......................... | 62/131 |
| 6,595,430 B1 * | 7/2003 | Shah | ........................ | 236/46 R |
| 6,988,248 B1 * | 1/2006 | Tang et al. | ................... | 715/839 |
| 2005/0056033 A1 * | 3/2005 | Gingras | ....................... | 62/129 |

OTHER PUBLICATIONS

Helmer, *Plasma Storage Freezers*—30° C., eight pages, published Jan. 2004.
Helmer, *Laboratory Freezers*—30° C., eight pages, published Jan. 2004.

* cited by examiner

*Primary Examiner*—Marc E Norman
(74) *Attorney, Agent, or Firm*—Barnes & Thornburg LLP

(57) ABSTRACT

A freezer for the storage of blood plasma and other blood products includes a user interface device which permits a user to adjust operating parameters of the freezer. The user interface device is operable to display the current status of the freezer. A defrost icon is displayed when the freezer is in defrost mode. The user interface device a graphical representation of the temperature within the freezer over the previous twenty-four hours. The controller of the freezer stores temperature related events which can be displayed on the user interface device or downloaded to a remote computer.

19 Claims, 9 Drawing Sheets

BLOOD PRODUCTS FREEZER WITH EVENT LOG

BACKGROUND

The present disclosure relates generally to freezers used in the storage of blood and blood products.

Storage and preservation of blood and blood products such as plasma requires the use of refrigeration equipment. In order to preserve the quality of the products stored in the equipment, the temperature within the refrigerated compartment must be controlled. The refrigerated compartment is accessed by, for example, opening the door. When the door is opened, ambient atmospheric air is introduced into the refrigeration compartment thereby increasing the temperature within the compartment. Moreover, moisture in the ambient air may condense in the refrigeration compartment, thereby reducing the effectiveness of the refrigeration process.

SUMMARY

A freezer for the storage of plasma and other blood products has a temperature event log. The freezer may also have a cabinet with an opening to a storage compartment, a door pivotably coupled to the cabinet and closeable to cover the opening, and a refrigeration unit coupled to the cabinet and configured to cool the storage compartment. The freezer may also have a temperature sensor coupled to the cabinet in the storage compartment, a controller electrically coupled to the temperature sensor and operable to receive signals from the temperature sensor, and a user interface coupled to the cabinet and electrically coupled to the controller.

The door handle may engage a latch coupled to the cabinet and the latch may include an electrical switch which is activated when the door is closed. In some embodiments, the electrical switch may be independent from the latch and operable to activate when the door is closed. The electrical switch may be in communication with the controller to provide a signal that the door is closed. The controller may be operable to receive the signal from the electrical switch.

The controller may be operable to monitor the operation of the refrigeration unit and to store information related to the operation of the refrigeration unit. The controller may have a microprocessor and a memory device. The microprocessor may be programmed with software dedicated to the operations of the freezer. The microprocessor may have a real time clock which maintains the information related to the current date and time. The controller may employ a proportional-plus-integral-plus-derivative (PID) based control methodology in controlling the refrigeration unit.

The controller may monitor the main power, battery charge status, compressor temperature, storage compartment temperature, and door status. The controller may be operable to store data related to the monitored operations. For example, the controller may store the beginning and end of alarms for the door open, high storage compartment temperature, low storage compartment temperature, compressor temperature, low battery, no battery, or main power failure. Storage of this event data may include a sequential event number, the alarm status such as beginning or ending, the alarm type, the date of the event, the time of the event, and the temperature in the storage compartment at the time the event occurred.

The controller may monitor and log the defrost operation of the freezer. This log may include a sequential event number, defrost status such as beginning or ending, the date of the event, the time of the event, the temperature in the storage compartment at the time the status is logged, and the number of door openings which occurred since the previous log entry.

The data log may be accessible from the user interface in the form of displayed data. The data log may also be accessible through a peripheral connector configured to allow the memory stored by the controller to be accessed by a discrete computer. The connector may also provide access to the microprocessor software to allow the software to be modified.

The user interface may include a display screen and several user input devices such as buttons. The display may be a liquid crystal display (LCD) screen. The user interface may be operable to display information and to provide inputs to the controller by way of the user input devices. The information displayed may include the temperature sensed by the temperature sensor, the defrost status, the current date and time, and a graphical representation of the temperature sensed for the previous 24 hours. The graphical representation of the temperature for the previous 24 hours may include lines representing the upper and lower control limits for the temperature. If the freezer is in defrost mode, the display may include an icon which flashes and changes size to indicate that the unit is in defrost mode and that the door should not be opened.

The user interface may provide access to additional information beyond the standard information displayed. The display may operate as a menu driven device accessing various information stored within the controller. A main page may provide access to the event log, system alarms test and status, a view of the system configuration, a page to allow editing of the system configuration, product information, or a help index. Some screens may require a password or pass code for a user to access the information.

The user interface may include input devices such as buttons. The input devices may be in communication with the controller and operable to change operating parameters of the freezer. The input devices may be operable to navigate the various menus and screens in the display. In some embodiments, the input devices may be membrane switches. In other embodiments, the input devices may be integrated in the display with the display being a touchscreen device. The display may be a monochromatic display. In some embodiments, the display may be a colored display.

The freezer may further include an audible output device to provide various audible alerts to a user. The audible output device may be coupled to the controller and operable to receive a signal from the controller. The audible output device may be operable to emit various tones, tone patterns, and volumes based on inputs from the user. In some embodiments, the audible output device may be a speaker. In some other embodiments, the audible output device may be a piezoelectric device. In some embodiments, the audible output device may be coupled to the display. In other embodiments, the audible output device may be coupled to the cabinet.

BRIEF DESCRIPTION OF THE DRAWINGS

The detailed description particularly refers to the accompanying figures in which.

DETAILED DESCRIPTION OF THE DRAWINGS

Figure 1:
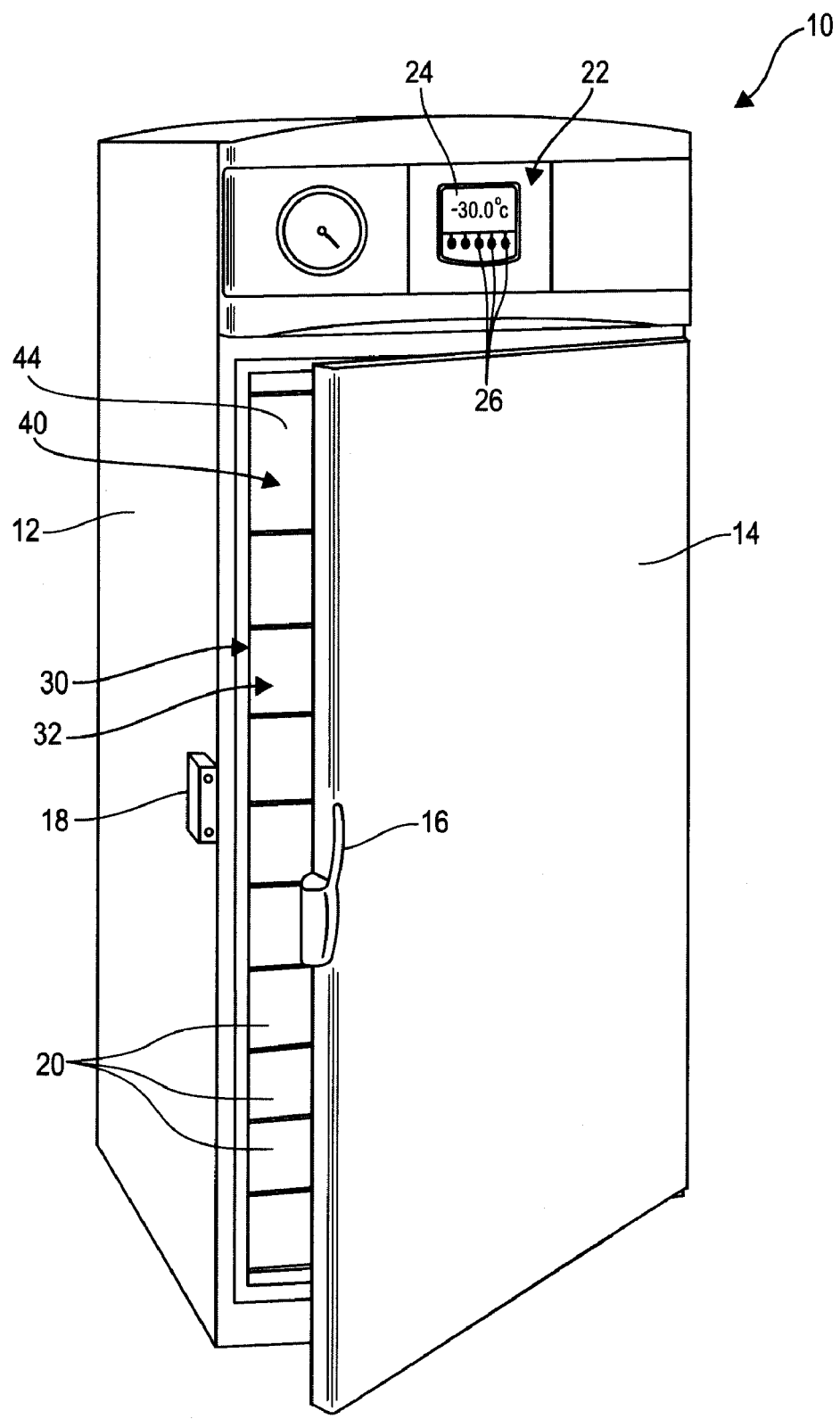
FIG. 1 is a perspective view of a freezer used for storing blood products.

A freezer 10 used to store plasma or other blood product is shown in FIG. 1. The freezer 10 has a cabinet 12 with a rectangular opening 30 which provides access to a storage compartment 32 inside of the cabinet. A door 14 is pivotably coupled to the cabinet 12 and is configured to cover the opening 30 and seal the storage compartment 32 when the freezer 10 is in use. The door 14 is pivotable between an open position as shown in the illustrative embodiment of FIG. 2, and a closed position wherein the door 14 covers the opening 30. A latch 18 is coupled to the cabinet 12 and configured to receive a portion of a handle 16 attached to the door 14. The latch 18 includes an electrical switch (see FIG. 7) which is activated when the door is in the closed position.

A number of storage units such as drawers 20 or racks 34 or both may be positioned in the storage compartment 32. Referring again to FIG. 1, the freezer 10 has an enclosure 40 which is configured to support a temperature sensor 42 as shown in FIG. 3. The enclosure 40 has a door 44, thereby allowing access to the area of the storage compartment 32 in which the temperature sensor 42 is positioned. In the illustrative embodiment of FIG. 2, the enclosure 40 is omitted. The temperature sensor 42 is electrically coupled to a controller 110 (shown diagrammatically in FIG. 7) which is configured to receive a signal from the temperature sensor 42 and process the signal to determine the temperature within the storage compartment 32.

A refrigeration unit 46 operates under the control of the controller 110 and is operable to chill the storage compartment 32. The refrigeration unit 46 is a compressor-based unit with a fan 48 (see FIG. 2) and refrigeration coils (not shown). A heating element 138 (shown diagrammatically in FIG. 7) is operable to defrost the refrigeration coils. It is necessary to defrost the coils so that the operation of the freezer 10 is predictable. The refrigeration unit 46 is controlled by the controller 110 and the control routine is based on the expected performance of the refrigeration unit 46. Defrosting of the coils and other components of the freezer 10 maintains the expected performance by preventing the insulating effect of frost on components.

Figure 2:
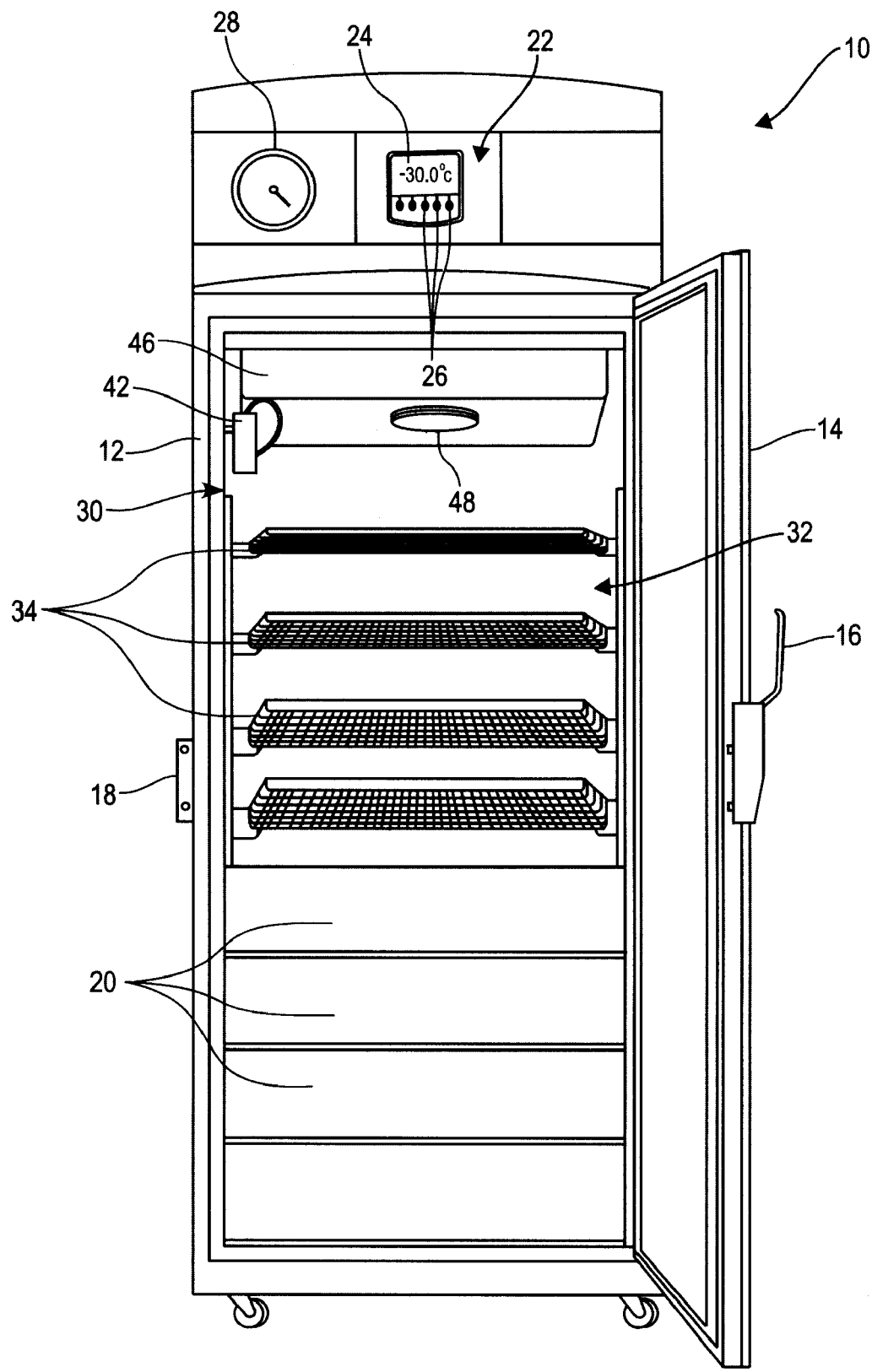
FIG. 2 is a front view of a freezer used for storing blood products.
Figure 3:
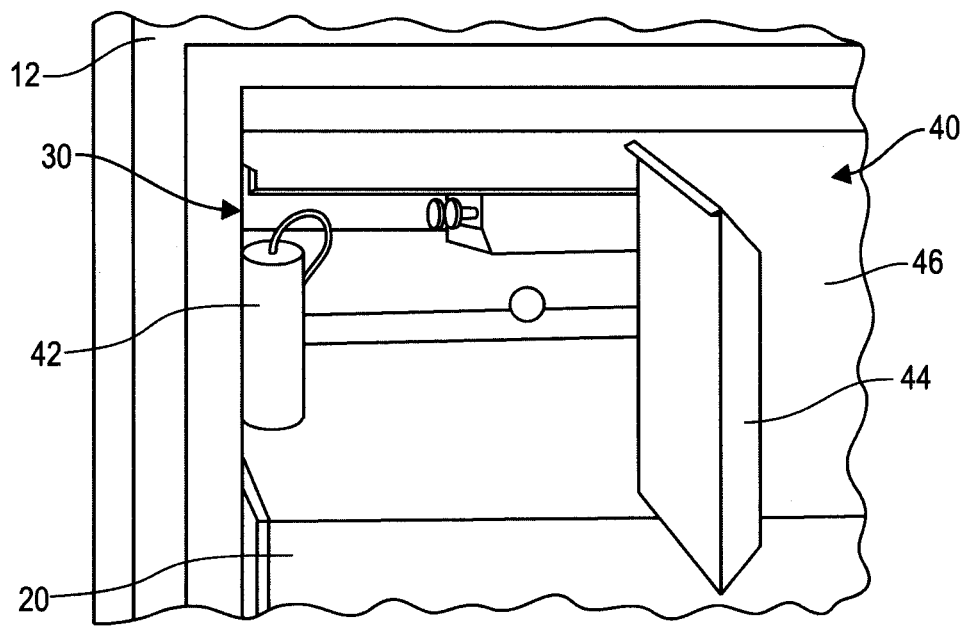
FIG. 3 is an enlarged view of a temperature sensor space within the freezer of FIG. 1.

As shown in FIGS. 1 and 2, the freezer 10 has a user interface device 22. The user interface device 22 has a display device 24 and multiple input devices 26. The user interface device 22 is in communication with the controller 110 to provide input to the controller 110 from a user through the input devices 26, and provide visual output to the user via the display device 24.

Figure 7:
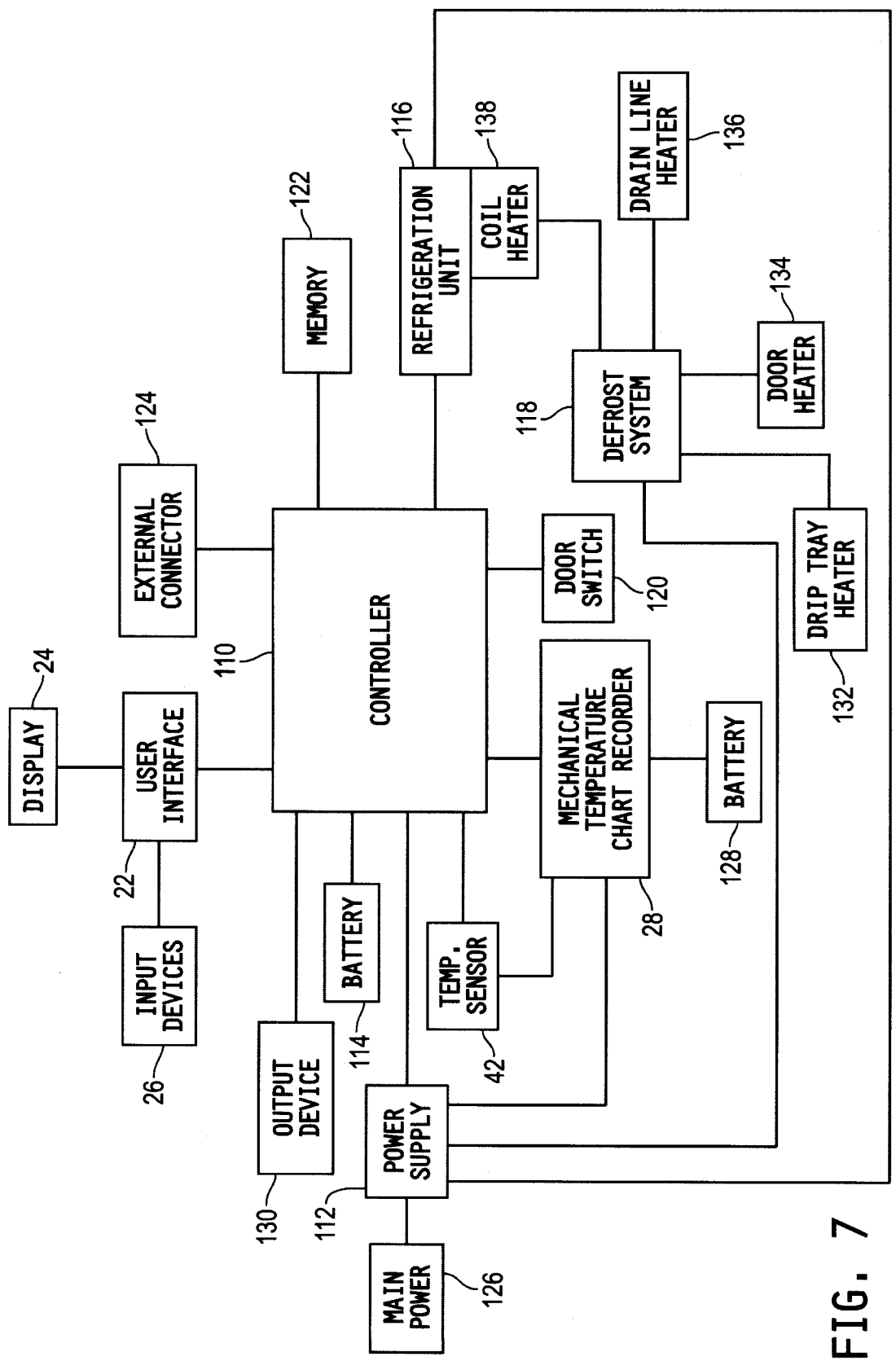
FIG. 7 is a diagram of the control portion of the electrical system of the of the freezer of FIGS. 1 & 2.

Referring now to FIG. 7, the interaction of the controller 110 and the various input and output devices is shown diagrammatically. The controller 110 operates as a central processor and is in communication with the various peripheral devices to either receive inputs or provide outputs. The controller 110 receives power from a power supply 112 which is coupled to a main power source 126. The main power source 126 is a 110 volt AC power source as is typically found in wall outlets. In some embodiments, the main power source 126 may be a 230 volt AC power source. The power supply 112 includes transformers, conditioners, and filters to provide the correct voltage and current to various equipment coupled to the power supply 112. Additionally, the controller 110 is coupled to a battery 114 which provides power to the controller 110 in case of a power loss. The battery 114 is sized sufficiently to provide power to stabilize the volatile memory within the controller 110 and to continue to maintain the real time clock in the controller 110.

The controller 110 is also in communication with the refrigeration unit 116 and operable to turn the refrigeration unit 116 on and off. The defrost system 118 includes resistive coils which provide heat when powered. The controller 110 is operable to activate the defrost system 118 which powers the resistive coils so that frost which has accumulated may be melted. By providing localized heating, the frost is melted relatively quickly without introducing excessive heat to the storage compartment 32.

A coil heater 138 is part of the defrost system 118 and is located within the coils of the refrigeration unit 116 and operable to defrost refrigeration coils in the refrigeration unit 116. A door heater 134 is coupled to the door 14 and operable to defrost the inside of the door 14. Yet another heater coil, a drain line heater 136, is coupled to a drain line which is located in the bottom of the cabinet 12. The drain line is coupled to a drain in the bottom of the storage compartment 32 and receives fluid that results from the melting of frost, the fluid being urged by gravity through the drain line and out of the storage compartment 32. Still another coil, a drip tray heater 132, is coupled to a drip tray within the storage compartment 32. The drip tray captures the fluid that results from melting frost and provides a surface for the fluid to travel to the drain. The result is that in operation, the defrost system 118 melts excess frost assures that the excess moisture is removed from the storage compartment.

The controller 110 also communicates with the temperature sensor 42 so as to receive a signal from the temperature sensor 42, the signal being indicative of the temperature within the storage compartment 32. This signal is amplified and converted from an analog to a digital signal so the controller 110 may process the signal. The signal is processed by software within the controller 110. Additionally, the controller 110 receives a signal from the door switch 120. The door switch 120 provides an indication that the door 14 is closed.

The controller 110 is also in communication with a memory device 122. The memory device 122 is operable to store the software used by the controller 110. This is independent of any memory that is internal to the controller 110 that is used as volatile memory for operations performed by the controller 110. The memory device 120 is accessible through a connector 122 which allows the software stored in the memory device 120 to be accessed and updated by a user using a discrete computer.

Figure 8:
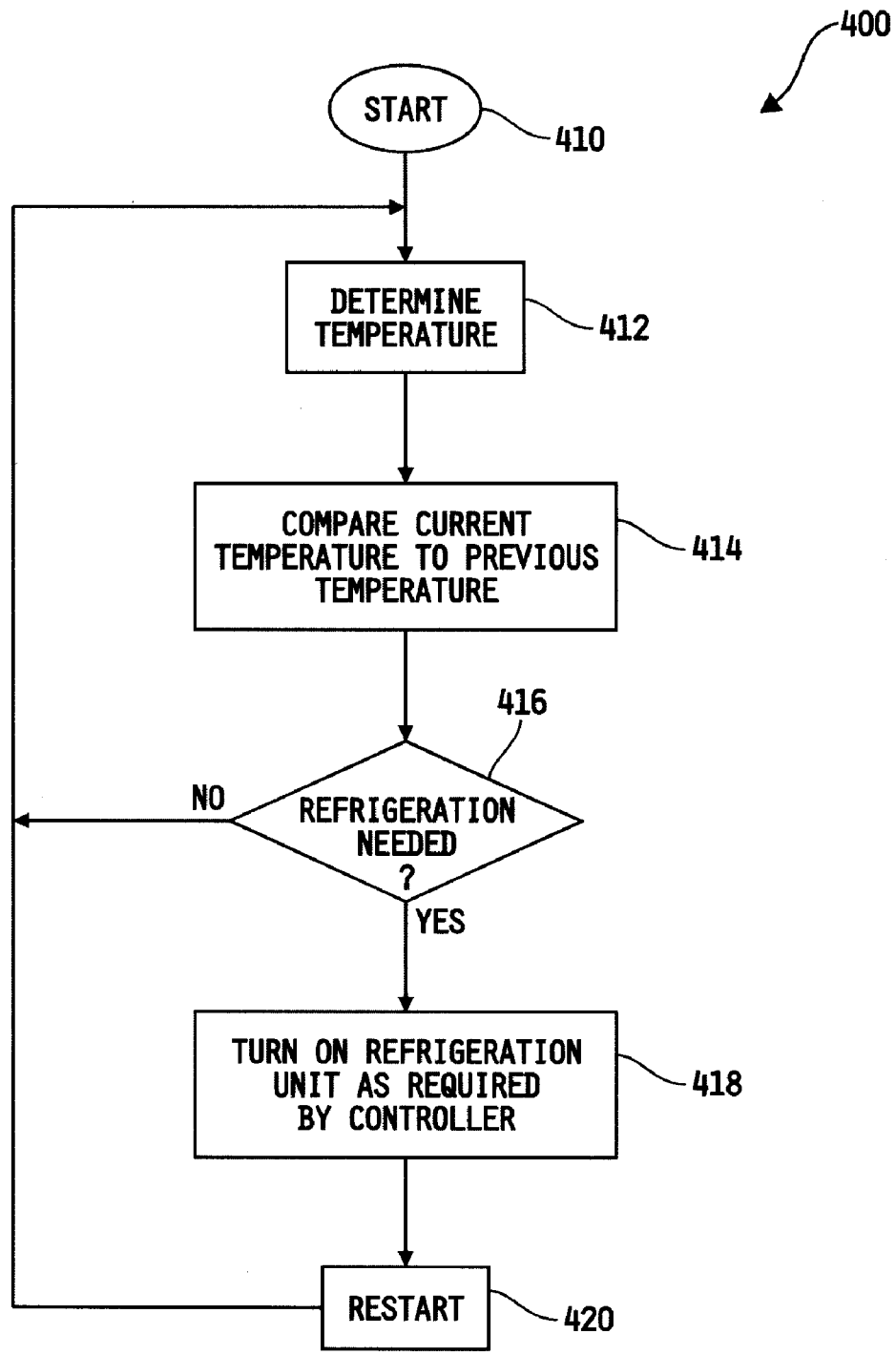
FIG. 8 is a flow chart of a temperature control routine for controlling the temperature within the freezer.

Referring now to FIG. 8, a control routine 400 for the control of the refrigeration unit 46 is shown. A step 410 in the routine represents the commencement step which occurs upon start-up of the freezer 10 and is followed by step 412 which determines the temperature of the storage compartment 32. The temperature is determined by the controller 110 which receives a signal from the temperature sensor 42, converts the signal from analog to digital, and processes the digital signal to convert it to a digital value indicative of the temperature in the storage compartment 32. Once the temperature value is determined, the control routine 400 progresses to step 414 where the current temperature value is compared to one or more previous temperature values. The temperature comparison is made considering the actual temperature value and the rate of change of temperature in the storage compartment 32.

In step 414, a proportional-plus-integral-plus-derivative (PID) based control routine is used to make a branch decision whether or not to turn on the refrigeration unit 46. The PID control routine may be adapted to consider temperature rises and decays within the storage compartment. Moreover, the effect of additional cooling created by the refrigeration unit 46 even after the unit is turned off, the additional cooling being a result of the refrigeration unit 46 being a heat sink for a period of time after the refrigeration unit 46 stops operating, may be considered in the step 414.

At step 416, the control routine 400 makes the determination as to whether refrigeration is necessary. If no refrigeration is necessary, the routine 400 cycles back to step 412 and repeats the process. If refrigeration is necessary, then the routine 400 progresses to step 418 and turns the refrigeration unit 46 on for a predetermined period of time. Once the step 418 is complete, the routine progresses to step 420 which restarts the analysis at the step 412 and completes another loop of the control routine 400.

Figure 9:
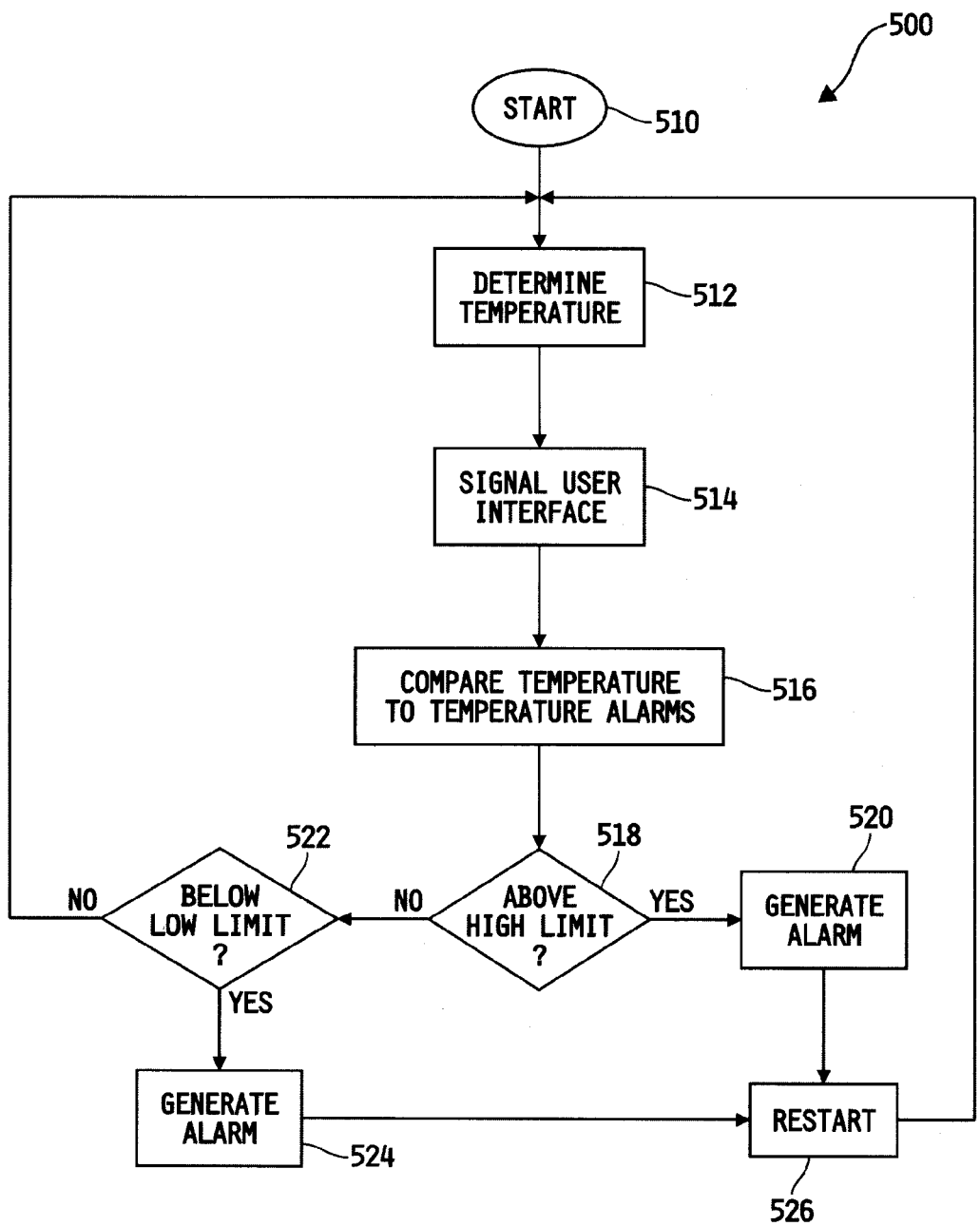
FIG. 9 is a flow chart of a routine for monitoring, displaying, and logging the temperature within the freezer.

A control routine 500, shown in FIG. 9, operates continuously during operation of the freezer 10 to monitor the temperature in the storage compartment 32 and compare the temperature in storage compartment 32 to the alarm limits set by a user. The control routine 500 commences at start-up of the freezer 10 at step 510. The control routine 500 then advances to step 512 where the temperature is determined by the controller 110 which receives a signal from the temperature sensor 42, converts the signal from analog to digital, and processes the digital signal to convert it to a digital value indicative of the temperature in the storage compartment 32. Once the temperature is determined, the controller 110 progresses to step 514 where the value of the temperature is passed to the user interface device 22 as a digital signal which is then converted by the user interface device 22 to create a numeric representation of the temperature on the display device 24.

The control routine then progresses to step 516 where the temperature is compared to the alarms set by the user. At step 518, the control routine 500 evaluates the temperature to the high limit. If the temperature is above the high limit, the control routine 500 advances to step 520 where a high temperature alarm is generated. Generation of the high temperature alarm results in a signal to the display device 24 of the user interface which provides a visual indication of the alarm. Additionally, the audible output device 130 is signaled to generate an audible alarm and the alarm is logged by the control routine 700 discussed below. The control routine 500 then progresses to step 526 which results in a restart of the control routine 500.

If the determination at 518 is that the temperature level is not above the high limit, then the control routine 500 advances to step 522 which compares the temperature to the low limit. If the temperature is below the low limit, the control routine is advanced to step 524 which results in the generation of an alarm similar to step 520 discussed above. Namely, a visual alarm is signaled to the display device 24, an audible alarm is signaled to the audible output device 130, and the alarm will be logged by control routine 700. Once the alarm has been generated, the control routine advances to step 526 which results in a restart of the control routine 500. In the event that the temperature is not below the low limit at step 522, then the control routine returns to step 512 to complete another iteration of the control routine 500. Control routine 500 thereby continuously monitors the temperature and temperature alarm status during the operation of the freezer 10.

Figure 10:
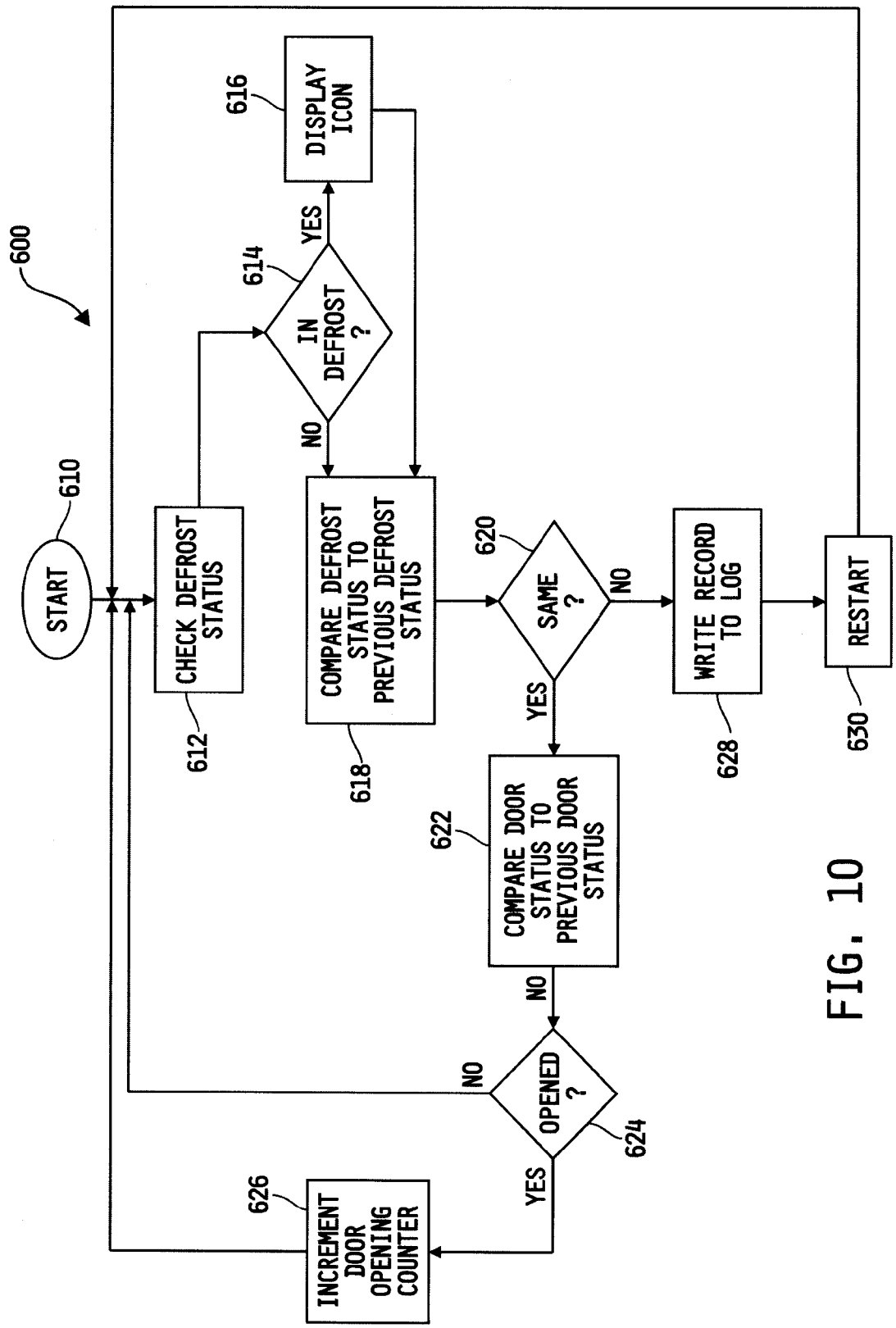
FIG. 10 is a flow chart of a routine for monitoring, displaying, and logging the defrost status of the freezer.

A control routine 600 for the monitoring of the defrost status of the freezer 10 is shown in FIG. 10. The control routine 600 commences at step 610 which occurs upon start-up of the freezer 10. The control routine 600 advances to the step 612, where the status of the defrost system 118 of the freezer 10 is ascertained. The routine 600 advances to step 614 where a decision is made regarding the defrost status. If the freezer 10 is in defrost mode, the routine 600 advances to step 616 which results in a signal to the user interface device 22 to display an indication that the freezer 10 is in defrost on the display device 24. Once the signal is sent to the user interface device 22, the control routine 600 advances to the step 618. If the freezer 10 is not in defrost mode at step 614, then the control routine 600 advances directly to step 618.

At step 618, the defrost status is compared to the previous defrost status the last time the control routine 600 was completed. At step 620 the result of that comparison results in a branch decision. If the defrost status is the same as it was in the previous loop of routine 600, the routine advances to step 622 where the status of the door switch 120 is compared to the previous loop. The routine 600 then advances to step 624 where another branch decision is made. If the door switch 120 status does not indicate that the door has been opened, then the routine 600 returns to step 612 to complete another loop of routine 600. If the door switch 120 has changed to an opened status from the previous loop, then the routine advances to step 626 which processes the door switch status to increment a door open counter to tally the number of door openings during a particular defrost status. Once this analysis is made, then the routine 600 returns to step 612 to complete another loop.

If the decision at step 620 had been that the defrost status was different, then the control routine 600 would advance to step 628 which would result in the writing of a record to the defrost log. The information logged to the defrost log is discussed in more detail in the illustrative embodiment of FIG. 6 below. Once the record is written, the door opening counter is reset to zero. The control routine 600 advances to step 630 which results in the restart of the control routine 600 through another loop. The control loop 600 operates continuously during the operation of the freezer 10.

Figure 11:
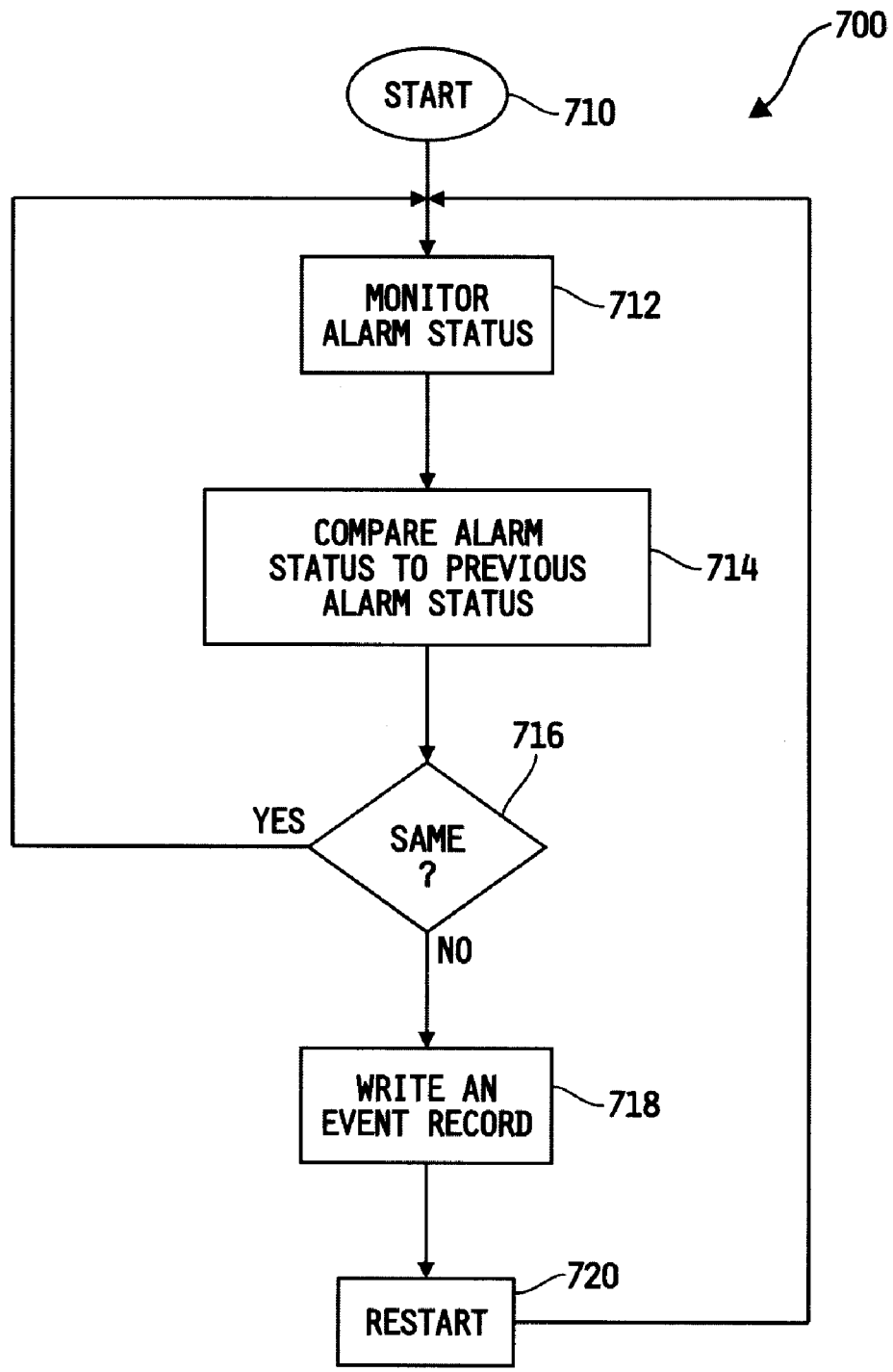
FIG. 11 is a flow chart of a routine for monitoring and logging alarms associated with the operation of the freezer.

In addition to the defrost log of the illustrative embodiment of FIG. 10, an event log control routine 700 is shown in FIG. 11. The purpose of the event log control routine 700 is to provide a detailed history of the alarms experienced by the freezer 10 so that a user may evaluate the operation of the freezer 10 and determine if the freezer 10 is operating properly and safely preserving the blood products stored therein. The event log control routine 700 commences at step 710 upon start-up of the freezer 10 and advances to step 712 where the current status of all alarms within the freezer 10 is determined.

The control routine 700 then advances to step 714 where the alarm statuses are compared to the previous alarm statuses in the previous loop. At step 716, a branch decision is made. If the alarm statuses are the same, the control loop 700 returns to step 712 to complete another loop of the control routine 700. If the alarm statuses are not the same, then the control routine 700 advances to step 718 which results in an event record being generated and written to memory. The event record includes a serial identifier, a status identifier, namely whether it is the beginning or ending of the event, the date of the event status logged, the time of the event status logged, the temperature within the storage compartment 32 at the time of the log entry, and a code identifying the type of event. Types of events logged include open door, high storage compartment temperature, low storage compartment temperature, high compressor temperature, low battery, no battery, or main power failure. The control routine 700 operates continuously during the operation of the freezer 10 such that the event log includes all events which occur.

Figure 4:
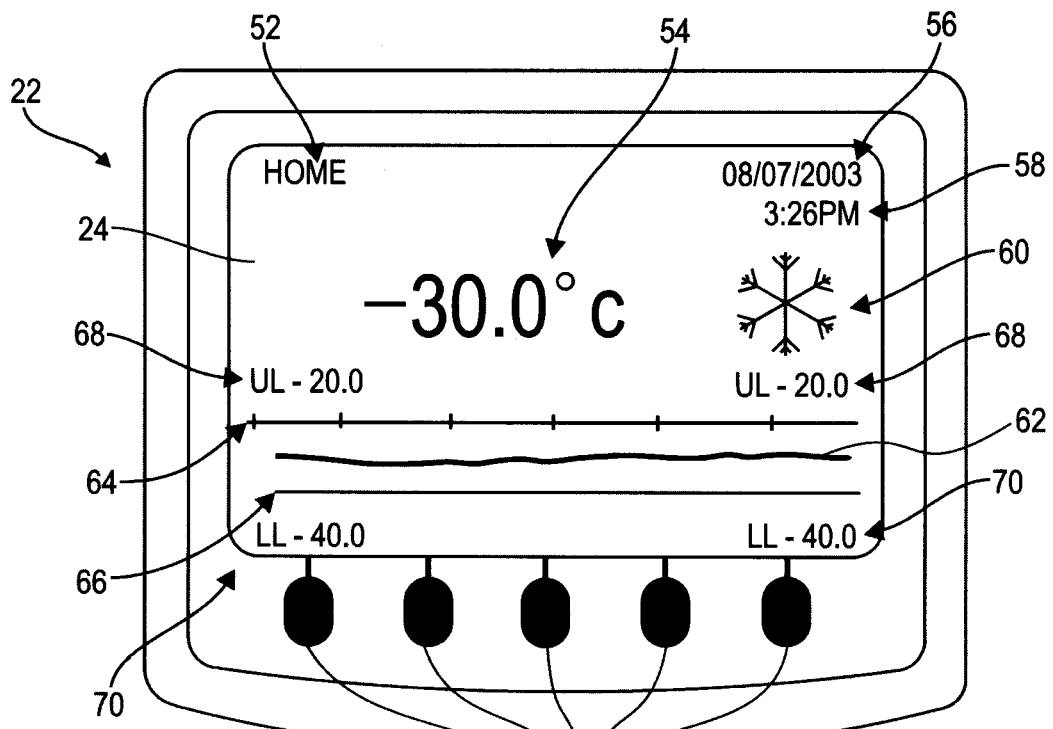
FIG. 4 is a front view of a user interface of the freezer of FIGS. 1 & 2, the user interface displaying a home screen.

Referring now to FIG. 4, in one illustrative embodiment, the display device 24 is a monochromatic liquid crystal display and is operable to display information to a user. A home screen is shown in FIG. 4. The home screen is indicated by the home indicator 52 in the upper left corner of the display device 24. The current temperature in the storage compartment 32 (as sensed by the temperature sensor 42) is displayed as temperature reading 54. The current date 56 and current time 58 are displayed as well. A defrost icon 60 is displayed when the freezer 10 is in defrost mode. The defrost icon 60 is animated. In particular, the defrost icon 60 is displayed in three different sizes cycling through the three sizes as the freezer 10 defrosts. As used herein, the freezer 10 is defined to be in "defrost mode" when any one or more of the coil heater 138, the drain line heater 136, the door heater 134, or the drip tray heater 132 is being powered.

Figure 5:
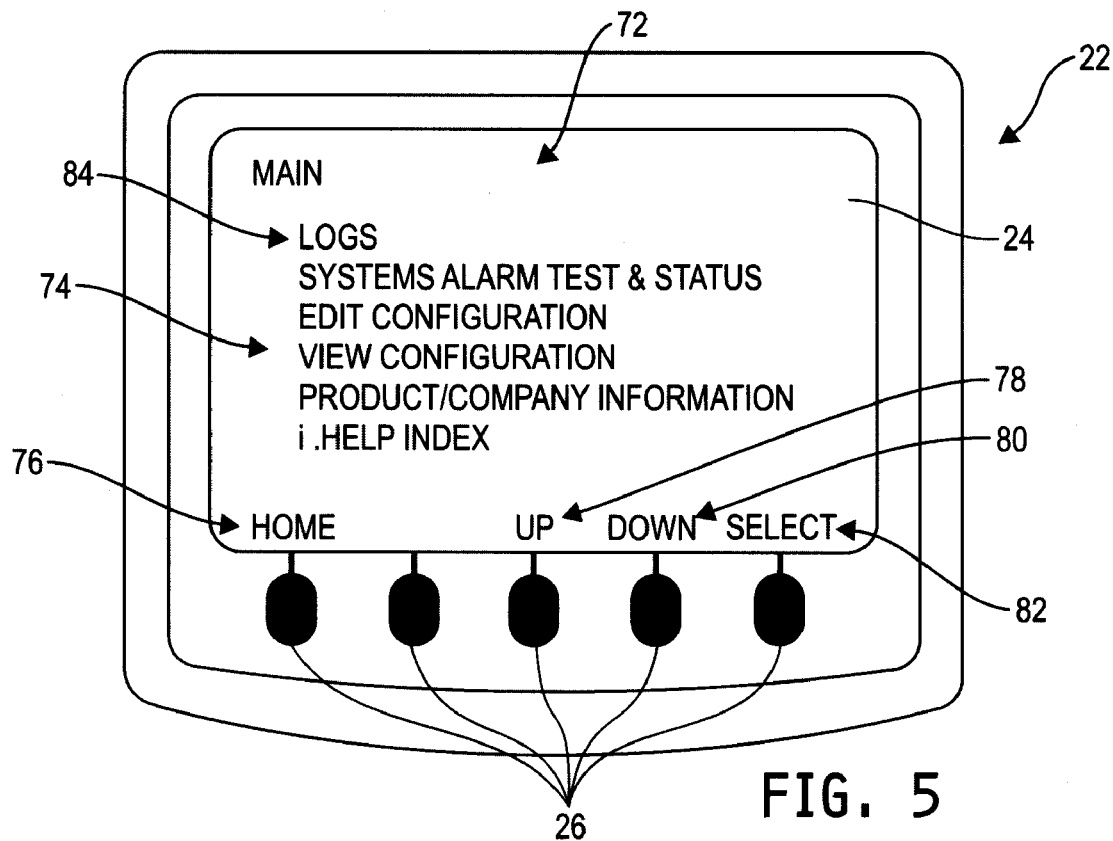
FIG. 5 is a front view of a user interface of the freezer of FIGS. 1 & 2, the user interface displaying a main screen.

Shown on the lower portion of the display is a temperature vs. time plot 140 of the temperature sensed by the temperature sensor 42 and processed by the controller 110, the plot including upper and lower temperature limits. The plot 140 includes a temperature line 62, a high temperature line 64 and a low temperature line 66. The high temperature line 64 set point 68 is displayed at both ends of the high temperature line 64. Likewise, the low temperature line 66 set point 70 is displayed at both ends of the low temperature line. Activation of any of the input devices 26 transfers the display to a main screen 72 shown in FIG. 5.

The main screen 72 on display device 24 is the primary navigation menu screen in the user interface device 22. From main screen 72, a user may choose a selection from the menu 74 by using the input devices 26 to navigate and select screens. One input device 26 is associated with a navigate home 76 operation which will jump to the home screen shown in FIG. 4. Another input device 26 is associated with a navigate up 78 operation. Yet another input device 26 is associated with a navigate down 80 operation. The final navigation operation is a select 82 operation which is associated with yet another input device 26. For example, a user could navigate to a LOGS selection 84 on the menu 74 and perform the select 82 operation which would then operate to display the defrost log screen 84 shown in FIG. 6.

The defrost log screen 84 has an indicator 86 that displays what screen is being displayed. The log display has six columns. The first column 88 is a serial event identifier which is automatically generated by the controller 110 when an event is detected. The second column 90 is an event identifier which identifies whether the event has started or ended. An event start is indicated by the uppercase character S. An event end is indicated by an upper case E. The third column 92 displays the date of the event and the fourth column 94 displays the time of the event. The fifth column 96 displays the temperature as sensed by the temperature sensor 42 and processed by the controller 110. The sixth column 98 indicates the number of times the door 14 is opened during the event. In the event log generated by control routine 700 (not shown), the sixth column is replaced with an indicator of the type of alarm. The various alarms which are coded as an event include open door, high storage compartment temperature, low storage compartment temperature, high compressor temperature, low battery, no battery, or main power failure. It should be noted that any of a number of events being monitored by the controller 110 may be logged and the types of events should not be listed to only those herein.

Figure 6:
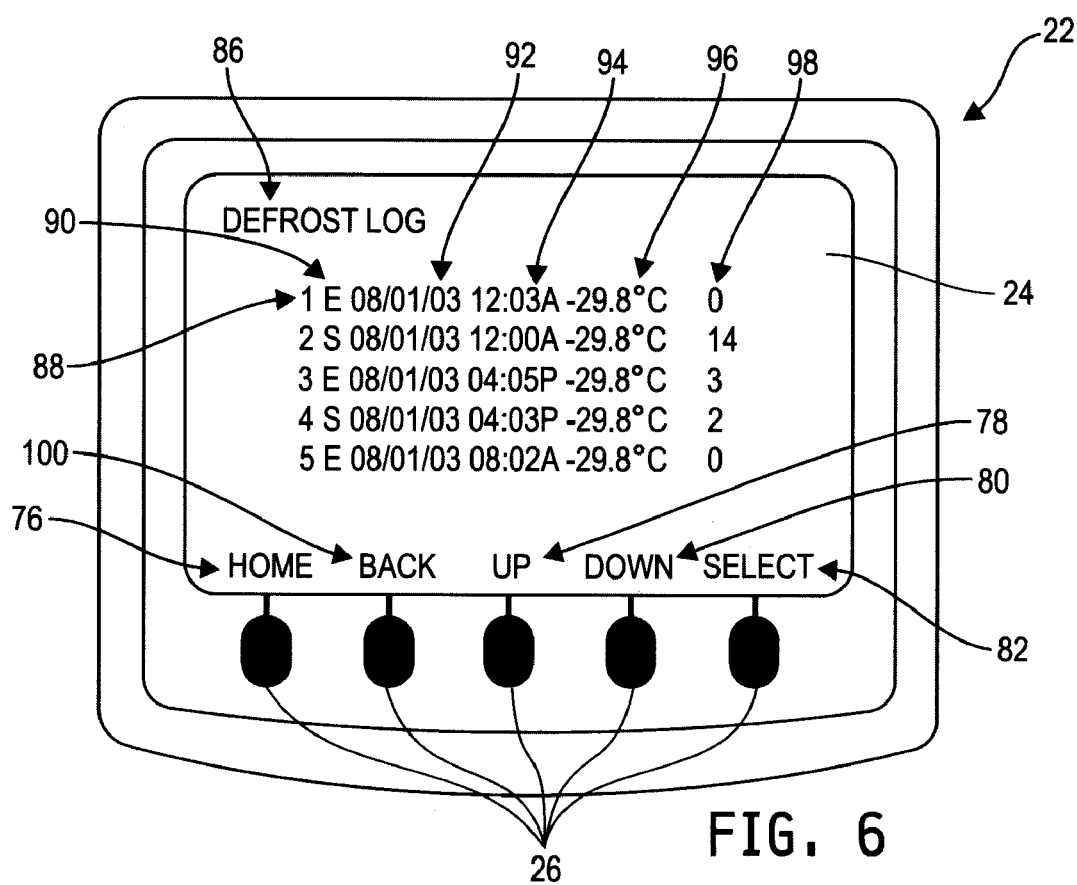
FIG. 6 is a front view of a user interface of the freezer of FIGS. 1 & 2, the user interface displaying a defrost log screen.

As can be seen in FIG. 6, the user interface device 22 may have additional navigation operations based on the particular screen displayed. The defrost log screen 84 has an additional operation for back navigation 100. The back navigation 100 operation navigates to the parent screen to the particular screen displayed. For example, in the defrost log screen 84, the back operation 100 would return the user to the main screen 72 shown in FIG. 5. The defrost log screen 84 also has the other navigation operations 76, 78, 80, 82. The home navigation operation 76 is present on all other screens so that the user may return to the HOME screen of FIG. 4. The controller 110 is also operable to maintain a log of the number of times the door 14 is opened over the previous 24 hour period.

Although certain illustrative embodiments have been described in detail above, variations and modifications exist within the scope and spirit of this disclosure as described and as defined in the following claims.

The invention claimed is:

1. A freezer comprising
a refrigeration unit,
a controller electrically coupled to the refrigeration unit, the controller operable to (i) determine if the freezer is in defrost mode, (ii) count and log the number of times a freezer door is opened while the freezer is in defrost mode, (iii) write data to memory when a defrost mode has ended, and (iv) reset the number of door opened counts to zero after the data is written to memory,
a temperature sensor electrically coupled to the controller, and
a user interface device electrically coupled to the controller, the user interface device having (i) a display device operating in a first mode in which the display device includes a first portion operable to display an indicator when the freezer is in defrost mode, a second portion displaying the current temperature sensed by the temperature sensor, and a third portion displaying a graphical representation of historical temperatures compared to temperature limits, the display operating in a second mode in which the display device displays a log related to the operation of the freezer, and (ii) an input device operable to receive input from a user.

2. The freezer of claim 1, wherein the indicator that the freezer is in defrost mode cyclically changes sizes.

3. The freezer of claim 1, wherein the controller stores a log of temperature related events, and the display displays the log of temperature related events when the display is in the second mode.

4. The freezer of claim 3, wherein the log includes the date of an event, the time of the event, and the temperature during the event.

5. The freezer of claim 1, wherein the log includes the number of times a door was opened while the freezer was in defrost mode.

6. The freezer of claim 1, wherein the controller stores output from the temperature sensor to provide data for the display of historical temperatures.

7. The freezer of claim 1, wherein the freezer further comprises an audible output device which is operable to generate an audible alarm if a door is opened while the freezer is in defrost mode.

8. The freezer of claim 1, wherein the user interface device displays a visual alarm if the door is opened and the freezer is in defrost mode.

9. The freezer of claim 1, wherein the controller includes a memory device and an external connector configured to provide external access to data stored in the memory device.

10. The freezer of claim 1, wherein the indicator is an icon displayed on the display.

11. The freezer of claim 10, wherein the icon is cyclically displayed in three different sizes.

12. A method of operating a blood bank freezer, the method comprising
- determining if the freezer is in defrost mode,
- displaying an icon on a display device if the freezer is in defrost mode,
- logging the number of times a freezer door is opened while the freezer is in defrost mode,
- displaying a temperature of a storage compartment of the freezer,
- logging the temperature of the storage compartment during the defrost mode,
- writing data to memory upon sensing that the defrost mode has ended, and
- resetting the door opened counter to zero upon writing the data to memory.

13. The method of claim 12, wherein the displaying step includes cyclically displaying the icon in a number of different sizes.

14. A freezer comprising
- a controller operable to (i) determine if the freezer is in defrost mode, (ii) count and log the number of times a freezer door is opened while the freezer is in defrost mode, (iii) write data to memory when a defrost mode has ended, and (iv) reset the number of door opened counts to zero after the data is written to memory,
- a temperature sensor electrically coupled to the controller, and
- a user interface device electrically coupled to the controller, the user interface device including a display operating in a first mode in which the display device includes a first portion having an icon displayed on the display when the freezer is in the defrost mode, a second portion displaying the current temperature, and a third portion displaying a graphical representation of historical temperatures compared to temperature limits, the display operating in a second mode in which the display device displays a log related to the operation of the freezer.

15. The freezer of claim 14, wherein the icon is animated.

16. The freezer of claim 15, wherein the icon cyclically and continuously changes sizes.

17. The freezer of claim 16, wherein the controller is configured to store a log of temperature related events, the log including (i) the date of an event, (ii) the time of the event, and (iii) and the temperature during the event, and the display is configured to display the log of temperature related events.

18. The freezer of claim 14, wherein the controller includes a memory device and an external connector configured to provide external access to data stored in the memory device.

19. The freezer of claim 14, wherein the controller is configured to store a log of temperature related events, the log including (i) the date of an event, (ii) the time of the event, and (iii) and the temperature during the event, and the display is configured to display the log of temperature related events.

* * * * *

UNITED STATES PATENT AND TRADEMARK OFFICE
CERTIFICATE OF CORRECTION

PATENT NO.      : 7,617,690 B2                                  Page 1 of 1
APPLICATION NO. : 10/979663
DATED           : November 17, 2009
INVENTOR(S)     : Dennis K. Dawes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Nineteenth Day of October, 2010

David J. Kappos
*Director of the United States Patent and Trademark Office*